United States Patent [19]

Kidd

[11] 4,362,533

[45] Dec. 7, 1982

[54] TERPOLYMERS OF ETHYLENE, VINYL ACETATE, AND STYRENE AS POUR POINT DEPRESSANTS FOR DISTILLATE FUELS

[75] Inventor: Nash A. Kidd, Freeport, Tex.

[73] Assignee: The Dow Chemical Company, Midland, Mich.

[21] Appl. No.: 749,849

[22] Filed: Dec. 13, 1976

[51] Int. Cl.$^3$ .............................................. C10L 1/22
[52] U.S. Cl. ...................................................... 44/62
[58] Field of Search ........................................... 44/62

[56] References Cited

U.S. PATENT DOCUMENTS 3,520,861 7/1970 Thompson et al. ................ 260/88.1
3,803,034 4/1974 Dasch ..................................... 44/62

Primary Examiner—Charles F. Warren
Assistant Examiner—Y. Harris-Smith
Attorney, Agent, or Firm—W. J. Lee

[57] ABSTRACT

The flow properties of petroleum distillate fuel oils at low temperature are improved by adding a pour point depressant amount of certain terpolymers of ethylene, vinyl acetate and styrene, particularly characterized as having more uniform macromolecular composition and distribution of monomer constituent units polymerized in the terpolymer macromolecules, made by terpolymerization under steady state conditions and pressure at least 1000 atmospheres and temperature at least 200° C.

4 Claims, No Drawings

TERPOLYMERS OF ETHYLENE, VINYL ACETATE, AND STYRENE AS POUR POINT DEPRESSANTS FOR DISTILLATE FUELS

BACKGROUND OF THE INVENTION

U.S. Pat. No. 3,803,034 to A. G. Dasch describes the problems associated with the loss of fluidity of hydrocarbon oils at low temperatures and distinguishes the class of materials known in the petroleum art as middle distillate fuels. It also describes certain terpolymers for use as pour point depressants in hydrocarbon oils. The subject terpolymers of the patent are composed of (1) an olefin illustrated by ethylene, (2) an arylalkylene illustrated by styrene and (3) an unsaturated ester illustrated by (I) vinyl acetate and (II) methyl methacrylate.

No pour point data are given in the patent for ethylene-styrene-vinyl acetate terpolymers. However, the terpolymers described in that patent do not appear to be satisfactorily effective or efficient when used in the middle distillate fuel oil subclass of hydrocarbon oils such as No. 2 fuel oil.

Accordingly, an object of this invention is to provide improved pour point depressants. A particular object is to provide such improved pour point depressants for middle distillate fuels. Another object is to provide such improved pour point depressants for middle distillate fuels which are effective at lower concentration and are thus more efficient. Other objects and advantages of the invention will be apparent in the description that follows.

BRIEF SUMMARY OF THE INVENTION

The objects of this invention are attained in and by pour point depressant agents which are improved terpolymers of ethylene, vinyl acetate and styrene which are characterized as to composition and flow properties and which are made by polymerizing a monomeric mixture of ethylene, vinyl acetate and styrene in a reaction mixture under steady state polymerizing conditions of high pressure and temperature. The steady state of polymerization is provided and maintained by feeding the monomeric reactants in a substantially constant and continuous manner to a polymerization reaction mixture and removing that mixture from the reaction zone in a substantially constant and continuous manner to leave a substantially constant quantity of reaction mixture in that reaction zone, in which zone the reaction mixture is maintained substantially uniform in composition throughout, as by vigorous stirring, and under substantially constant temperature of at least 200° C. and substantially constant pressure of at least 1000 atmospheres.

Under such conditions of steady state terpolymerization under high temperature and pressure, as more particularly described hereinafter, terpolymer products are obtained which are advantageously effective and efficient as pour point depressants especially for middle distillate fuel oils. It is believed that the unexpectedly improved results are attributable to the more uniform composition and distribution of monomer constituent units in the terpolymer macromolecules which are obtained when those terpolymers are made by terpolymerization in the steady state and under the critical conditions described.

DETAILED DESCRIPTION AND EMBODIMENTS

The steady state terpolymerization is advantageously carried out in an autoclave having means, e.g. agitator stirring means, to effect vigorous end-to-end mixing of its contents so that the composition of the reaction mixture therein is maintained substantially uniform throughout the mixture. The autoclave and all of its appurtenances are designed in the manner known in the art of polymerizing ethylene by free-radical initiation to withstand high temperature and high pressure and to provide for supply and flow of materials, instrumentation, control and safety, and for removal, recovery and processing of product. Steady state polymerizations are described in the polymer art, e.g., in U.S. Pat. No. 3,520,861.

The starting monomeric ethylene, vinyl acetate and styrene are fed in substantially constant and continuous manner to the autoclave, usually in separate streams to facilitate control and variation. Also fed to the autoclave in substantially constant and continuous manner is a free-radical initiator, usually a peroxygen compound such as tert.-butyl peroctoate, that is conventional for such polymerization of ethylene. Optionally, there is also fed to the autoclave in substantially constant and continuous manner a chain transfer agent known for its effect on such polymerization of ethylene, such as propane or isobutane. The free-radical initiator, in conventional fashion, is usually handled as a solution in a liquid solvent carrier, and the amount and rate fed to the autoclave is selected to sustain the polymerization reaction under the chosen conditions.

Such polymerization technology is well known in the art of polymerizing ethylene. In accordance with the present invention, such polymerization technology is particularly characterized by maintaining the reaction mixture in the reaction zone of the autoclave at temperature of least 200° C. and pressure of at least 1000 atmospheres. Further, the starting monomers are fed to the steady state polymerization zone at rates such that the resulting terpolymer product has substantially constant composition in the range of from about 45 to about 75 weight percent ethylene, the balance being at least 5 weight percent vinyl acetate and at least 5 weight percent styrene. The polymerization conditions, including concentration of free-radical initiator in the reaction zone and optionally the presence and concentration of chain transfer agent, are chosen as known in the art to produce terpolymer product whose melt flow rate, determined by a modification of ASTM D-1238-70 Procedure A, using 0.020-inch orifice and 2160 grams load at 80° C., is in the range from about 1 to about 50 dg/min. The lower limit of melt flow rate is preferably from about 1 to about 5 when the concentration of ethylene in the terpolymer is in the range from about 65 to about 75 weight percent, respectively.

The terpolymerization reaction mixture is continuously withdrawn from the autoclave at substantially constant rate corresponding to the aggregate rates of feed, the terpolymer product is separated and recovered, and the unreacted ethylene is usually recycled to the polymerization zone, all in manner conventional for the polymerization of ethylene.

For use as pour point depressant additives, these terpolymers are advantageously formulated by mixing them with a petroleum distillate material such as kerosene, usually in proportions of 1–3 parts of terpolymer to 1–3 parts of diluent and such mixtures can be further diluted as desired.

The terpolymers of this invention, usually in the form of diluted formulations in kerosene or like diluent, are advantageously used as pour point depressants in hydrocarbon oils, especially middle distillates of petroleum which include kerosene, jet fuel, diesel fuel, and fuel oil. The concentration of terpolymer in such materials is selected according to the amount of depression in the pour point that is desired, usually in the range from about 10 to about 5000 ppm of polymer solids in the distillate fuel. It is found that the improved terpolymers of this invention are unexpectedly and advantageously more efficient than the known terpolymers.

Moreover, the terpolymers of this invention are found to improve the filterability and pumpability of distillate fuel compositions containing pour point depressant concentrations of such terpolymers.

It is further found that the terpolymers of this invention are advantageously employed in combination with each other or in combination with another polymeric pour point depressant additive to effect improvement in flow of middle distillate fuels at low temperature. Such mixtures are frequently synergistic and show effect on the pour point that is greater than the sum of individual effects would have predicted. Such mixtures are also frequently effective in a greater variety of different middle distillate fuels than are the individual agents. The present terpolymers are particularly effective in combination with other known pour point depressant copolymers of ethylene, especially those ethylene copolymers with an ethylenically unsaturated ester, e.g. a vinyl ester such as vinyl acetate or an alkyl ester of mono-ethylenically unsaturated carboxylic acid such as ethyl acrylate, butyl acrylate and the like. Such other pour point depressant copolymers of ethylene and methods of making and using them are known in the art, e.g. from U.S. Pat. No. 3,048,479 (1962) by S. Ilnyckyj et al. and from U.S. Pat. No. 3,447,915 (1969) by B. M. Otto. When used in combinations with such other ethylenic polymer depressants, the present terpolymers are usually used in proportion of from 10 to 90 parts thereof per 100 parts of total depressant, by weight.

The following examples illustrate the invention but are not to be taken as limiting its scope. In the examples parts and percentages are by weight unless otherwise specified or required by context. The melt flow rates (MFR) in these examples and throughout the specification and claims are in decigrams per minute as measured by modification of ASTM D 1238-70, Procedure A, using 0.020-inch orifice, total load 2160 grams, at 80° C. The pour point values were measured by a test described in ASTM D 97-66.

EXAMPLE 1

A terpolymer was prepared in continuous manner under steady state conditions of polymerization in a stirred autoclave at 16,000 psi and 232° C. by feeding thereto these materials:

|  | Feed Rate Pounds per Hour |
| --- | --- |
| Ethylene | 40 |
| Vinyl Acetate | 12.4 |
| Styrene | 2.6 |
| Propane (1) | 7 |
| Initiator (2) | 2 |

(1) Chain transfer agent
(2) Containing 8% tert.-butyl peroctoate in hydrocarbon solvent.

Effluent reaction mixture from the autoclave was released to low pressure in a flash devolatilizer vessel where the terpolymer was separated from unreacted starting monomers and other volatile materials. The resulting terpolymer had melt flow rate (MFR) of 17.7; its composition was 65.1% ethylene, 19.9% vinyl acetate, and 15% styrene.

The resulting terpolymer was tested as pour point depressant in a standard commercial No. 2 fuel oil having a natural pour point of 0° F. The boiling range of the fuel oil by ASTM D 1078-70 was 181° C. (initial) to 355° C. (dry). The terpolymer was first dissolved in kerosene to make a solution having 60% terpolymer, then that solution was further diluted with p-xylene to a solution having 6% terpolymer. The 6% terpolymer solution was admixed with the No. 2 fuel oil in amount to provide therein the concentration in parts per million of terpolymer shown below with the effect on pour point as indicated:

| Terpolymer Concentration | Pour Point °F. |
| --- | --- |
| None (blank) | 0° |
| 60 ppm | −18° |
| 120 ppm | −28° |

For purposes of contrast, it is noted from the Dasch U.S. Pat. No. 3,803,034 Example VII that 250 ppm of the terpolymer prepared as described in the patent Example II was required in No. 2 fuel oil to lower the pour point from 10° F. to −20° F.

EXAMPLES 2–6

Terpolymers were made under steady state conditions of polymerization in a stirred autoclave in the general method described in Example 1 with chain transfer agent and initiator and under pressure and at temperature shown in Table I. The resulting terpolymer products, whose properties are also shown in Table I, were formulated into 6% solutions with the diluents as described in Example 1. The terpolymers in the form of such solutions were tested as pour point depressants in the No. 2 fuel oil as described in Example 1 with results as also shown in Table I. For convenience, the data of Example 1 are repeated in Table I.

TABLE I

|  | Example No: | | | | | |
| --- | --- | --- | --- | --- | --- | --- |
|  | 1 | 2 | 3 | 4 | 5 | 6 |
| Terpolymerization |  |  |  |  |  |  |
| Ethylene, lbs/hr | 40 | 40 | 40 | 40 | 40 | 40 |
| Vinyl Acetate, lbs/hr | 12.4 | 10 | 12.4 | 16.4 | 12.4 | 10 |
| Styrene, lbs/hr | 2.6 | 5 | 2.6 | 1.6 | 2.6 | 5 |
| Chain transfer agent |  |  |  |  | none | none |
| propane, lbs/hr | 7 | 7 | — | 8.7 | — | — |
| isobutane, lbs/hr | — | — | 12.5 | — | — | — |
| Initiator (1) |  |  |  |  |  |  |
| concentration | 8% | 10% | 7% | 5% | 2% | 10% |
| lbs/hr | 2 | 5.5 | 3.5 | 3.5 | 2.5 | 2.8 |
| Pressure, psi × 10⁻³ | 16 | 16 | 16 | 16 | 15 | 18 |
| Temperature, °C. | 232 | 231 | 232 | 231 | 253 | 231 |
| Terpolymer Product |  |  |  |  |  |  |

TABLE I-continued

|  | Example No: | | | | | |
|---|---|---|---|---|---|---|
|  | 1 | 2 | 3 | 4 | 5 | 6 |
| Ethylene, % | 65.1 | 58.7 | 62.9 | 65 | 62.6 | 55.2 |
| Vinyl Acetate, % | 19.9 | 13.6 | 20.9 | 23.6 | 21.8 | 13.1 |
| Styrene, % | 15 | 27.7 | 16.2 | 11.4 | 15.6 | 31.7 |
| MFR, dg/min | 17.7 | 17 | 10.2 | 10.1 | 1.6 | 2.5 |
| Pour Point, No. 2 Fuel Oil (2) | | | | | | |
| 60 ppm terpolymer, °F. | −18 | −11 | −17 | −19 | −16 | −16 |
| 120 ppm terpolymer, °F. | −28 | −26 | −30 | −25 | −26 | −29 |

Notes:
(1) tert.-butyl peroctoate, solution in hydrocarbon diluent; rate of feed of solution.
(2) natural pour point 0° F.

EXAMPLE 7

This example illustrates the use of a combination of a known ethylenic polymer pour point depressant with a terpolymer according to this invention.

The terpolymer taken for this example was made in accordance with the steady state terpolymerization method described in Example 1 and contained 58.2% ethylene, 9.5% vinyl acetate, and 32.3% styrene, and had MFR (80° C., 0.02-inch orifice) of 1. Sixty parts of the terpolymer was thoroughly dispersed into 40 parts kerosene to form a composition here identified as Additive T.

The known pour point depressant was an ethylene polymer, prepared as described in U.S. Pat. No. 3,447,915 by polymerizing ethylene and n-butyl acrylate in the presence of propylene at about 535° F. under about 21,000 psi pressure in the presence of free-radical initiator, which polymer contained about 51% ethylene and 49% other monomers and had MFR (80° C., 0.02-inch orifice) of 10. About 58 parts of that polymer was thoroughly dispersed into 42 parts of kerosene to form a composition here identified as Additive A.

Equal parts of Additive T and Additive A were thoroughly mixed together to form a composition here identified as Additive Blend.

Each of the above (Additives T, A and Blend) was then separately diluted with 9 parts p-xylene, and the diluted solutions were separately added to a standard commercial No. 2 fuel oil in amount corresponding to 100 ppm of the Additive (kerosene solution); based on the polymer solids, the resulting three fuel oil compositions contained 60, 58, and 59 ppm polymer solids from Additive T, Additive A and Additive Blend, respectively. Other parts of the diluted solutions were similarly added to samples of the same fuel oil in amount corresponding to 200 ppm of the Additive (kerosene solution) thereby making fuel oil compositions containing 120, 116 and 118 ppm of the polymer solids from Additive T, Additive A and Additive Blend, respectively. The starting No. 2 fuel oil was the same as that used in Examples 1-6 and had a natural pour point according to ASTM D-97 of 0° F.

The pour point values of the fuel oil compositions containing the pour point depressant additives were measured in the same way with results shown in Table II.

TABLE II

| Additive T | | Additive A | | Additive Blend | |
|---|---|---|---|---|---|
| Concn. ppm* | Pour Point °F. | Concn. ppm* | Pour Point °F. | Concn. ppm* | Pour Point °F. |
| 60 | −12 | 58 | −12 | 59 | −17 |
| 120 | −24 | 116 | −26 | 118 | −34 |

*Concentration of polymer solids in parts per million of fuel oil.

EXAMPLES 8-15

Terpolymers were made under steady state conditions of polymerization in a stirred autoclave in the general method described in Example 1 with chain transfer agent and initiator and under pressure and at temperature shown in Table III. The Ferric chloride chain transfer agent used in Examples 14 and 15 was added as a solution, saturated at room temperature, of anhydrous FeCl₃ in vinyl acetate. The rates of feed thereof shown in Examples 14 and 15 are of the saturated solution, and the resulting feed of vinyl acetate is in addition to the principal feed of vinyl acetate to the terpolymerization reaction.

The resulting terpolymer products, whose properties are also shown in Table III, were formulated into 6% solutions with the diluents as described in Example 1. The terpolymers in the form of such solutions were tested as pour point depressants in two different No. 2 fuel oils with results as shown in Table III. The one designated Fuel Oil A was the same fuel oil described in Example 1. The one designated Fuel Oil B in Table III is one having boiling range 214° C. to 349° C. (ASTM standard method designation D 1078-70). The natural pour point temperature of Fuel Oil B is +8° C. (ASTM D 97-66), and it is peculiarly non-responsive to added polymeric pour point depressant additives.

TABLE III

|  | Example No: | | | | | | | |
|---|---|---|---|---|---|---|---|---|
|  | 8 | 9 | 10 | 11 | 12 | 13 | 14 | 15 |
| Terpolymerization | | | | | | | | |
| Ethylene, lbs/hr | 40.7 | 41.6 | 41.4 | 43.1 | 41.6 | 51.3 | 40.5 | 40.1 |
| Vinyl Acetate, lbs/hr | 28.5 | 23.0 | 25.4 | 21.9 | 25.4 | 28.2 | 28.2 | 28.2 |
| Styrene, lbs/hr | 1.5 | 1.5 | 1.6 | 1.1 | 1.6 | 1.8 | 1.8 | 1.8 |
| Chain transfer agent | | | | | | none | | |
| isobutane, lbs/hr | 3.0 | 1.7 | 3.3 | 2.6 | 3.3 | — | — | — |
| FeCl₃, lbs/hr (3) | — | — | — | — | — | — | 2.0 | 5.5 |
| Initiator (1) | | | | | | | | |
| concentration | 3% | 5% | 7% | 3% | 7% | 5% | 10% | 10% |
| lbs/hr | 4.5 | 4 | 5 | 4 | 4 | 5 | 3.5 | 6.5 |
| Pressure, psi × 10⁻³ | 16 | 16 | 16 | 16 | 17 | 16 | 16 | 16 |
| Temperature, °C. | 230 | 238 | 238 | 229 | 237 | 243 | 241 | 240 |
| Terpolymer Product, lbs/hr | 11.5 | 13.5 | 12 | 11.5 | 14 | 14 | 13.5 | 15.5 |
| Ethylene % | 49.6 | 59.7 | 56.0 | 59.0 | 53.7 | 57.8 | 49.3 | 47.8 |
| Vinyl Acetate, % | 39.6 | 30.8 | 32.6 | 31.7 | 34.7 | 33.7 | 36.9 | 38.8 |
| Styrene, % | 10.8 | 9.5 | 11.4 | 9.3 | 11.6 | 8.5 | 13.8 | 13.4 |

TABLE III-continued

| | Example No: | | | | | | | |
|---|---|---|---|---|---|---|---|---|
| | 8 | 9 | 10 | 11 | 12 | 13 | 14 | 15 |
| MFR, dg/min | 2 | 4.6 | 8.7 | 1.2 | 6.2 | 3.9 | 2.7 | 6.7 |
| Pour Point, No. 2 Fuel Oil (2) | | | | | | | | |
| Fuel Oil A: | | | | | | | | |
| 60 ppm terpolymer, °F. | −15 | −16 | −16 | −16 | −18 | −16 | −15 | −16 |
| 120 ppm terpolymer, °F. | −26 | −27 | −31 | −22 | −33 | −28 | −27 | −29 |
| Fuel Oil B: | | | | | | | | |
| 60 ppm terpolymer, °F. | +7 | +6 | +7 | +6 | +7 | +8 | +8 | +8 |
| 120 ppm terpolymer, °F. | −1 | −4 | −4 | 0 | −2 | −3 | 0 | −2 |

Notes:
(1) tert.-butyl peroctoate, solution in hydrocarbon diluent; rate of feed of solution.
(2) natural pour point of Fuel Oil A is 0° F.; of Fuel Oil B is +8° F.
(3) FeCl$_3$ added as saturated solution in Vinyl Acetate; rate of feed solution.

What is claimed is:

1. Pour point depressant terpolymers for middle distillate fuels, consisting essentially of from about 45 to about 75 percent ethylene, at least about 5 percent vinyl acetate, and at least about 5 percent styrene, by weight, and having melt flow rate as defined from about 1 to about 50 dg/min, particularly characterized in that the terpolymers are prepared by free-radical-initiated terpolymerization of ethylene, vinyl acetate and styrene under substantially steady state terpolymerization conditions of at least 1000 atmospheres pressure and temperature of at least 200° C.

2. A pour point additive composition for middle distillate fuels containing as essential constituent a terpolymer according to claim 1.

3. A pour point additive composition for middle distillate fuels comprising a mixture of ethylenic polymers having pour point depressant effect on such fuels, which mixture comprises from 10 to 90 percent by weight of such mixture of a terpolymer according to claim 1.

4. Middle distillate fuel compositions containing a pour point depressant concentration of a terpolymer according to claim 1.

* * * * *